(12) United States Patent
Lindgren et al.

(10) Patent No.: US 8,219,074 B2
(45) Date of Patent: Jul. 10, 2012

(54) METHOD AND APPARATUS FOR COMMUNICATION SITE PLANNING

(75) Inventors: Ulf Lindgren, Vastra Frolunda (SE); Bo Hagerman, Tyreso (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 36 days.

(21) Appl. No.: 12/996,659

(22) PCT Filed: Jun. 12, 2008

(86) PCT No.: PCT/EP2008/057414
§ 371 (c)(1),
(2), (4) Date: Dec. 7, 2010

(87) PCT Pub. No.: WO2009/149758
PCT Pub. Date: Dec. 17, 2009

(65) Prior Publication Data
US 2011/0090981 A1    Apr. 21, 2011

(51) Int. Cl.
*H04Q 7/20* (2006.01)

(52) U.S. Cl. .......... 455/422.1; 455/553.1; 370/328; 375/130

(58) Field of Classification Search .......... 455/422.1, 455/426.1, 426.2, 446, 552.1, 553.1; 375/130, 375/257; 370/328, 338
See application file for complete search history.

(56) References Cited

U.S. PATENT DOCUMENTS

| 6,351,652 | B1 * | 2/2002 | Finn et al. .................. 455/552.1 |
| 7,079,809 | B1 | 7/2006 | Scherzer |
| 7,406,106 | B2 * | 7/2008 | Mallory ....................... 370/522 |
| 7,792,193 | B2 * | 9/2010 | Tanizawa et al. ........ 375/240.16 |
| 7,944,978 | B2 * | 5/2011 | Kennedy et al. .............. 375/257 |
| 2004/0219896 | A1 * | 11/2004 | Gazsi et al. .................. 455/138 |
| 2010/0020872 | A1 * | 1/2010 | Shimizu et al. .......... 375/240.12 |

FOREIGN PATENT DOCUMENTS

| EP | 1643661 A | 4/2006 |
| EP | 1983781 A | 10/2008 |
| WO | 2007091317 A | 8/2007 |

* cited by examiner

*Primary Examiner* — Nhan Le
(74) *Attorney, Agent, or Firm* — Rothwell, Figg, Ernst & Manbeck, P.C.

(57) ABSTRACT

The present invention relates to a solution for determining wireless communication cell characteristics related to wireless MIMO transmission mode and dynamically selecting suitable communication transmission mode for certain parts of the wireless communication cell. The solution uses a flatness spectrum analysis of received impulse response from a plurality of measurement points in the cell using a plurality of antennas in a wireless network access gateway, e.g. a base station.

12 Claims, 5 Drawing Sheets

METHOD AND APPARATUS FOR COMMUNICATION SITE PLANNING

CROSS REFERENCE TO RELATED APPLICATION

This application is a 35 U.S.C. §371 National Phase Entry Application from PCT/EP2008/057414, filed Jun. 12, 2008, and designating the United States.

TECHNICAL FIELD

The present invention relates to a solution for determining suitable antenna configurations and transmission modes in relation to a communication cell site.

BACKGROUND

Deployment of a site can be cumbersome. One problem is to know what type of antenna to use and prediction of antenna usefulness in a system. In future access systems, it is likely that advanced concepts such as Multiple Input Multiple Output (MIMO) and Beam Former (BF) will become standard ways of transmission. To this end, it is clear that it would be advantageous to know which transmission scheme to use for specific users. A channel with flat spatial spectra is good for MIMO transmission. On the other hand a spatial spectrum with peaky spatial spectra is better for BF transmission.

Advanced antenna solutions enabling MIMO transmissions or BF transmission, are well known. However, today there is no direct method to determine which of these two are more suitable. Indirect methods such as observing Channel Quality Index (CQI) or Signal to Noise Ratio (SNR) may be used. The obvious drawback is that these observations do not provide information on the spatial spectral properties. Consequently, a report on low SNR at a position may result in using BF for a channel that has a large Power Azimuth Spread (PAS). MIMO transmission depend on if the channel is spatially flat (white). In the event of a spatial flat channel the channel matrix singular values are equally sized. The Singular Value Decomposition of an estimated channel is one way to determine the singular values.

Computing channel estimates and SVDs is costly and relies on pilot sequences. These sequences are not present in all packages implying that channel estimation can only be made at certain time instances.

SUMMARY

The present invention is based on the fact that the angular spectrum affects the antenna diagram. Typically, an effective antenna diagram is the convolution of the antenna diagram and the Power Azimuth Spread (PAS). Thus, the antenna beam will become smeared as the PAS becomes wider. However, the PAS is directly related to the angular spectrum. The angular spectrum is a Fourier pair with a spatial impulse response. The spatial impulse response can be captured by an array antenna. The captured impulse response can be modelled as a Finite Impulse Response (FIR) filter which is easy to Fourier transform, resulting in an angular spectrum. To this end, a spectral flatness measure can be used to quantify the shape of the angular spectrum seen from the Base Station (BS). That is to say, it provides a measure stating if a given location is good in terms of Multiple Input Multiple Output (MIMO) or Beam Former (BF).

It is an object of the present invention to provide a device and method that may determine a suitable transmission mode related to a certain point or area in a wireless communication cell using the spectral flatness measure.

This is provided by in a first aspect of the present invention, a method of selecting transmission mode in a wireless network cell, comprising the steps of:

receiving in an infrastructure node at least one wireless signal from a mobile node in the wireless cell; the signal being received in a plurality of antennas;

analyzing in the infrastructure node the signal using an algorithm for determining a spectrum flatness property of the signal;

storing in the infrastructure node in a database the determined flatness property of the signal in relation to a geographical position in the wireless cell;

using the determined flatness property for selecting transmission mode in communication between the infrastructure node and to a node located at the geographical position.

The step of analyzing may comprise using a flatness algorithm:

$$V = \frac{\frac{1}{2\pi} e^{\int_{-\pi}^{\pi} \log(|H_0(\omega)|^2) d\omega}}{\frac{1}{2\pi} \int_{-\pi}^{\pi} |H_0(\omega)|^2 d\omega}$$

where $H_0$ is the spectrum and is computed from the Fourier transform of the spatial impulse response $h(d)$:

$$H_0(\omega) = \sum_{d=0}^{N} h(d) e^{j\omega d}$$

and $N-1$ is the number of antennas used for receiving the signal.

The result may be used to determine suitable transmission mode categories and relating these to respective geographical positions in the cell. The transmission mode may for instance be one of multiple input multiple output or beam former.

The method may further comprise steps of comparing the received signal with the database and determining a geographical position of the mobile node using the comparison. This may be useful for determining geographical position in an e-911 service.

A second aspect of the present invention is provided, a communication node for controlling wireless communication in a communication network, the node comprising a transceiver portion, a processing unit, a memory unit, and a network communication interface, the transceiver portion is arranged to communicate with a plurality of antennas, wherein the processing unit is arranged to receive at least one wireless signal via the transceiver portion from a mobile node, to analyze the received signal using a flatness algorithm, to characterize a geographical position in a communication cell of the mobile node according to a flatness index, and to use the determined flatness index when selecting transmission mode between the communication node and a mobile node located at the geographical position.

These and other aspects of the invention will be apparent from and elucidated with reference to the embodiments described hereinafter.

With the solution according to the present invention, it is provided an advantage of being able to better utilize radio resources and enhance communication quality in a radio cell covered by a base station.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

Figure 1:
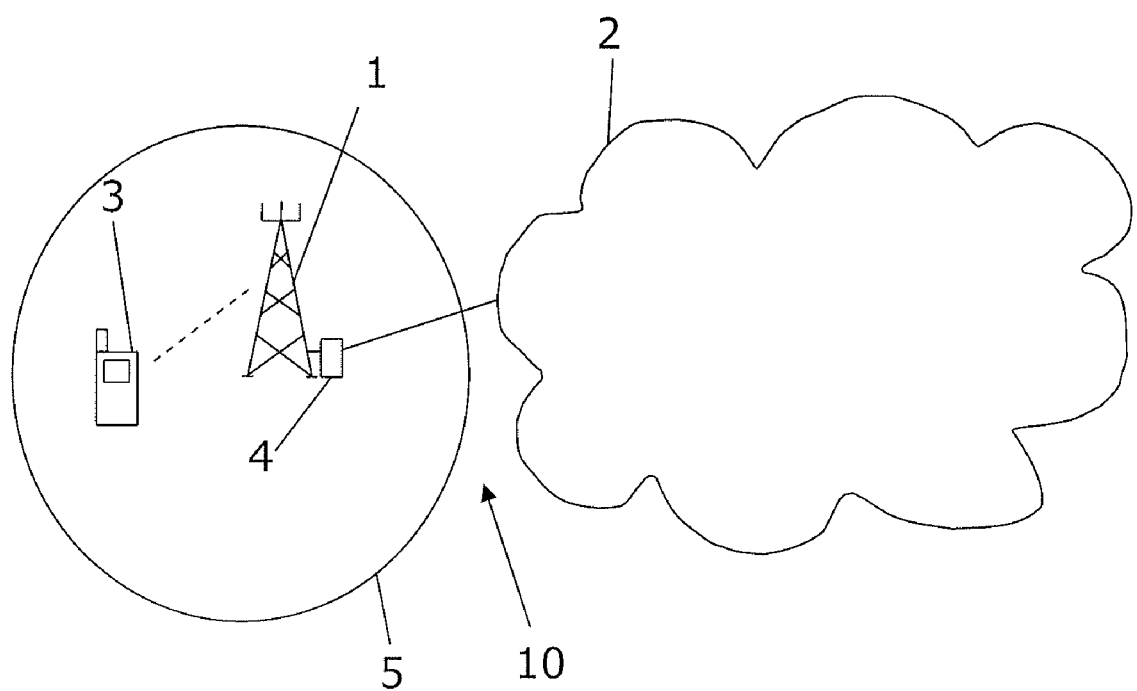
FIG. 1 illustrates schematically a network system according to the present invention.

In FIG. 1 reference numeral 1 generally indicates a base station or similar wireless network access gateway (e.g. access point, NodeB, eNodeB, and so on) to an infrastructure communication network 2. The base station 1 is arranged to communicate wirelessly with user equipment 3 within a communication range cell 5. The base station comprises a radio controller 4 for controlling the wireless communication via antennas and for controlling communication with the infrastructure network 2. The base station 1 further comprise a plurality of antennas and/or a plurality of base stations may be controlled by the radio controller 4. It should be noted that the exact configuration of the base station is of less importance to the invention as long as there are a plurality of antennas and a device/unit controlling the radio resources which will be apparent later in this document.

Figure 2:
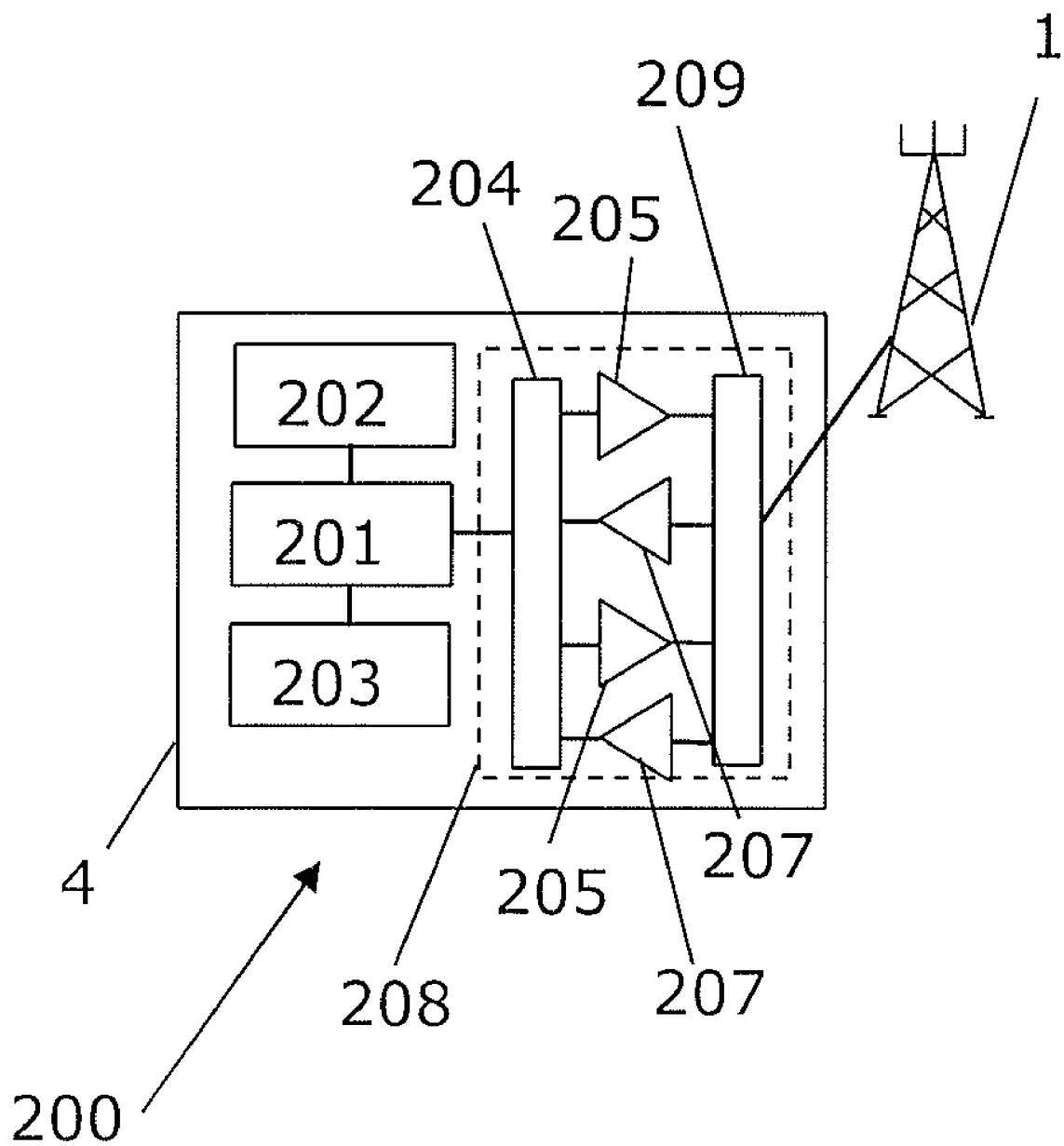
FIG. 2 illustrates schematically a device with an antenna configuration according to the present invention.
Figure 3:
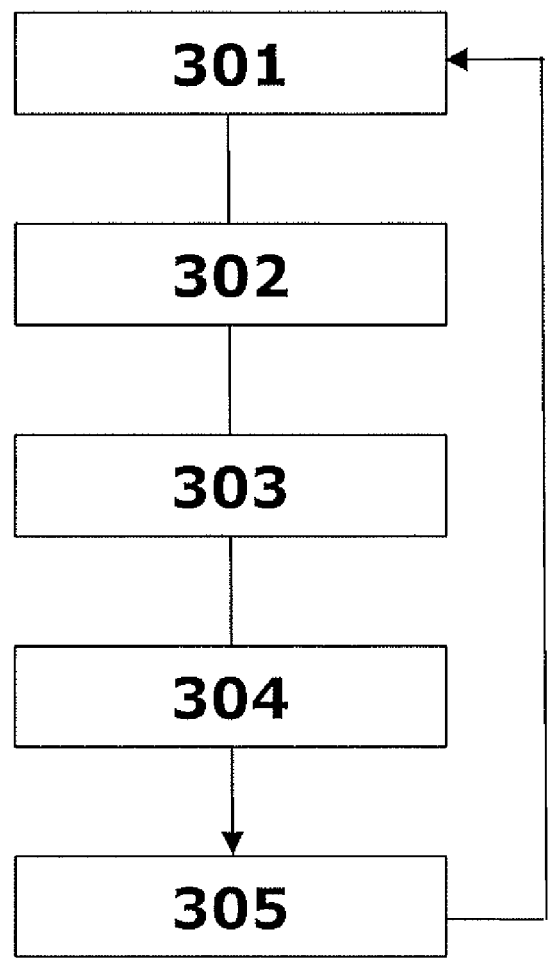
FIG. 3 illustrates schematically in a block diagram a method according to the present invention.

In FIG. 2 a device 4 (e.g. a base station) implementing the solution according to the present invention is shown. The device may comprise at least one processing unit 201, at least one memory unit 202, and at least one communication interface 203. Furthermore, the device comprises a transceiver portion 208 for receiving and transmitting radio signals. The transceiver portion may comprise AD/DA unit(s) 204, at least one transmitter power amplifier 205, at least one receiver power amplifier 207, and optionally a switch/multiplexer 209. The processing unit is arranged to run code for communication control and data traffic. It is further arranged to determine which antennas to use in a MIMO communication configuration. The processing unit 201 may comprise a microprocessor, a Digital Signal Processor (DSP), an ASIC (Application Specific Integrated Circuit), or an FPGA (Field programmable gate array). The memory unit 202 may comprise any suitable type of memory or combination thereof (volatile and/or non-volatile) such as e.g. RAM, ROM, EEPROM, Flash, and hard disk. The communication interface 203 connects the device 4 to the infrastructure network 2. It should be understood by the skilled person that other communication equipment may be present as well depending on the type of wireless communication protocol/standard used.

It should be noted that the transceiver portion 208 may be configured in different ways depending on radio technology and/or communication protocol used as understood by the skilled person.

The present invention is based on the fact that the angular spectrum affects the antenna diagram. Typically, an effective antenna diagram is the convolution of the antenna diagram and the Power Azimuth Spread (PAS). Thus, the antenna beam will become smeared as the PAS becomes wider. However, the PAS is directly related to the angular spectrum. The angular spectrum is a Fourier pair with a spatial impulse response. The spatial impulse response can be captured by an array antenna. The captured impulse response can be modelled as a Finite Impulse Response (FIR) filter which is easy to Fourier transform, resulting in an angular spectrum. To this end, a spectral flatness measure can be used to quantify the shape of the angular spectrum seen from the Base Station (BS). That is to say, it provides a measure stating if a position is good in terms of Multiple Input Multiple Output (MIMO) or Beam Former (BF).

The present invention may be utilized in order to characterize a wireless communication cell at installation time and/or momentarily during operation of the cell. This information may be used for optimizing the base station antenna configuration for static purposes or dynamically for obtaining an optimized communication link with a single UE.

The present invention uses a spectral measure for determining flatness of the signal applied in the context of advanced multi antenna systems.

The flatness of a spectrum is often of great interest, for example in prediction where the optimal residual spectrum is flat (white sequence) One such measure will be shown below and it will vary between zero and one. A one representing a flat spectrum and a zero is a non-flat spectrum. The function form for the flatness (or sometimes called whiteness) is then:

$$V = \frac{\frac{1}{2\pi} e^{\int_{-\pi}^{\pi} \log(|H_0(\omega)|^2) d\omega}}{\frac{1}{2\pi} \int_{-\pi}^{\pi} |H_0(\omega)|^2 d\omega} \quad (1)$$

where $H_0$ is the array response expressed as a polynomial of complex exponentials. Equation (1) will be zero when the effective array response is a constant, i.e. implying that no beam forming capability is available. Here the spectrum is computed from the Fourier transform of the spatial impulse response h(d):

$$H_0(\omega) = \sum_{d=0}^{N} h(d) e^{j\omega d} \quad (2)$$

where N−1 is the number of antennas in the configuration. The spatial impulse response is gathered over the antenna array as a snapshot in time. This implies that each element in the array must be accessible for processing.

A basic procedure for conducting an evaluation of a position may be as follows:
1. At position P send a known signal, i.e. sound the channel.
2. At the BS observe the impulse response over the antenna array h(d).
3. From the impulse response compute the corresponding spectrum $|H_0(\omega)|^2$ using e.g. equation (2).
4. Evaluate the flatness e.g. using equation (1).
5. Optionally store the result in a database with values for a selection of points in the cell serviced by the base station.

6. Optionally repeat the process for a number of points in the cell providing an array of points in a database with data covering at least part of the cell, for instance in order to provide a sufficiently detailed map of the cell in order to provide correct services in different parts of the cell.

The resulting measurement database may be used to determine the cell whiteness characteristics, whiteness characteristics of different areas of the cell, and/or whiteness characteristics of a single position/grid point of the cell 5. This measurement database may be stored in memory and used for selecting transmission mode of the infrastructure node handling communication with a mobile node in the cell for cell planning and/or dynamically during communication as will be discussed later. For instance, using data from the database a map may be provided for use by a network/cell planner illustrating whiteness characteristics at each measured point. In order to make the map more easily analyzed different thresholds may be defined. At each position a colored marker may be placed. For instance, if the color is red then the angular spectrum is considered flat at that position. A yellow and green dot signal mid-flat and non-flat respectively. The measure in equation (1) varies between zero and one and the coloring of the markers may be selected e.g. as a third each. It should be appreciated that more or less levels of thresholds may be applied and other markings than coloring schemes may be used, for instance hatchings, grey scales, other color schemes, 3D like plots, and so on. The number of thresholds may be divided into any suitable scale; however, in one embodiment of the present invention two or three may be sufficient in order to determine whether beam forming transmission or MIMO transmission is most suitable for a certain location and/or area in the cell.

It should be noted that even thought the measurement(s) is preferably operated by the base station or similar network access gateway the analysis of the measurements according to the present invention, may be performed at some other entity, for instance in a Radio Network Controller (RNC) or some other infrastructure device.

A Cumulative Density Function (CDF) of the flatness index may be used for instance as function of variation in array element distance. This type of function may, more appropriate, help to set the whiteness thresholds used to visualize cell characteristics or used to make transmission method decisions.

Consequently, apart from analysing the characteristics of cell points for the purpose of site deployment, it can be used in scheduling MIMO vs. BF transmission dynamically, since a user equipment actually is a point in the map transmitting some power.

Figure 4:
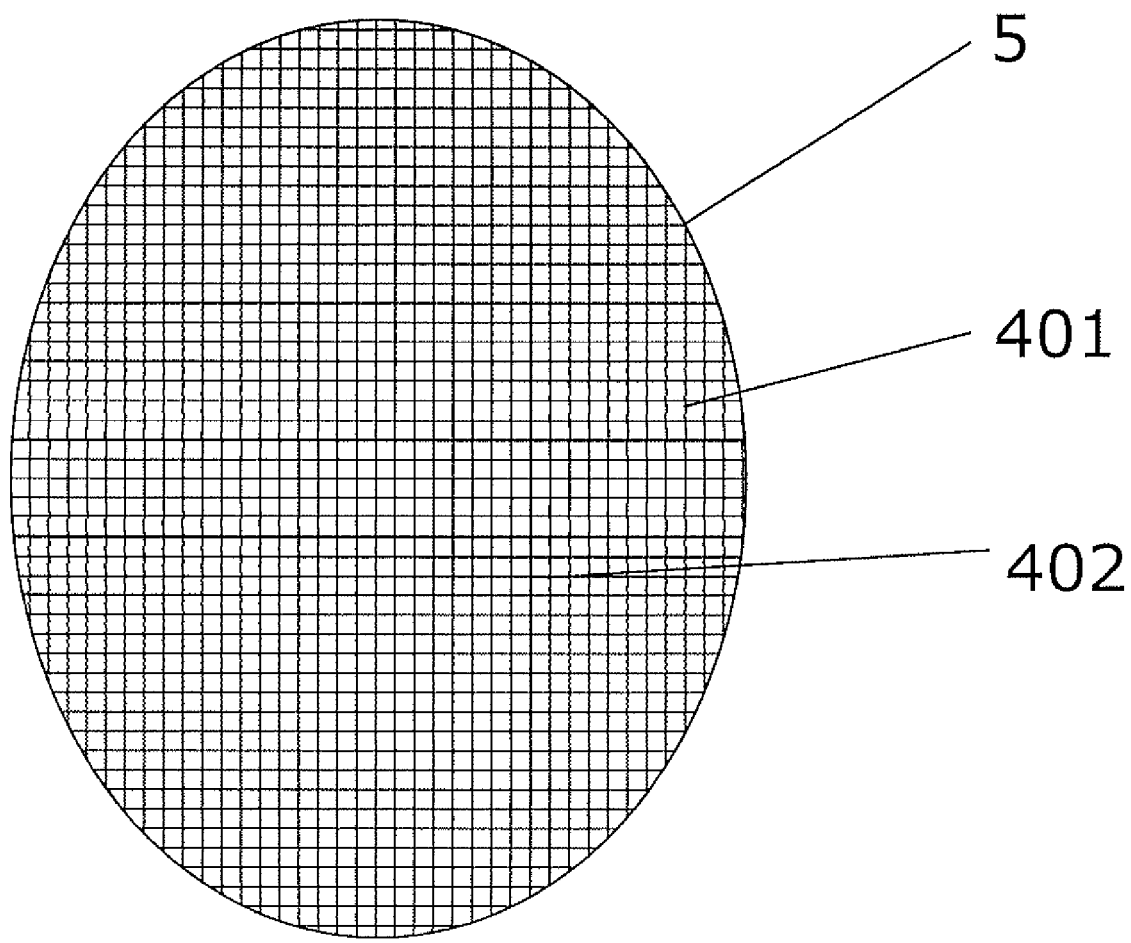
FIG. 4 illustrates schematically a cell divided into grid sub cells in accordance with the present invention.

With reference to FIG. 4 the cell 5 characterization will now be discussed in more detail. This type of characterization of the cell in determining the whiteness of a plurality of points in the cell is sometimes called gridding, i.e. the cell 5 is divided using a grid and each sub cell 401, 402 (only two sub cells are referenced, however, it should be understood that each sub cell may be referenced) determined by the grid will comprise data related to transmission characteristics e.g. from measurements. It should be noted that not all sub cells need to be measured; some may be assumed using some other type of mathematical or statistical analysis, some points may be uninteresting for some purposes, and further some points may have the transmission mode predetermined by virtue of geographical location in the cell (e.g. points inside buildings or located behind structures). The number and size of grid sub cells may depend on wanted resolution or cell size (i.e. for instance in relation to radio transmission power).

A new site deployment can benefit from this measure by using a geometrically based model of the environment at the site. The model will provide structural information which is vital for the angular spread. The whiteness index is essentially a measure of the spread in the channel and by gridding the channel model potential "hot spots" may be defined. Here a "hot spot" is a position which lends it self to MIMO transmission. This pre-planning process may be used to simulate or predict potential coverage and capacity for collection of site candidates at a specific location. The coverage and capacity is often specified as minimum requirements prior to site deployment. Thus, the whiteness index may serve as an automatic tool for choosing some best site position. Striving to find a best site is not limited to moving the position of site candidates; an alternative parameter is the antenna arrangement(s) used. That is, at a site position the antenna arrangement may be altered and for each alternation a gridding of the site takes place. Consequently, a best site is chosen both from position and antenna technique. It should be appreciated that the characterization of the cell may be performed using a model instead of physical measurement if topological information is available for the cell.

Figure 5:
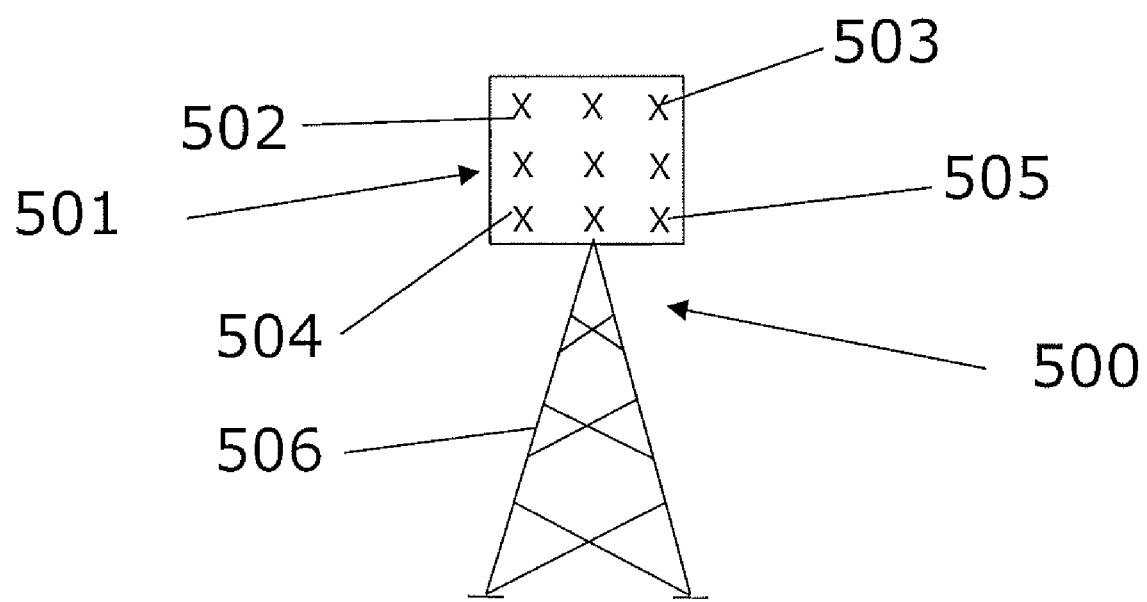
FIG. 5 illustrates schematically a base station with a plurality of antenna elements in accordance with the present invention.

An alternative to deploying a new site is to alter the antenna technology at an existing site. The procedure is similar to that of deploying a new site, but where the set of site candidates have a single member. Evidently, the only free variable left is the antenna arrangements. The whiteness index provides an indicator which may be used to predict the usefulness of various antenna technologies, e.g. multi stream and or beam forming. A BS with a plurality of antennas may select suitable antennas to use in a specific communication instant, for instance selecting a sub number of the plurality of available antennas. FIG. 5 illustrates a BS 500 with a plurality of antenna elements 501 located in this case on a tower 506. Considering a nine element antenna matrix 501, positioned in a linear three by three matrix, not all antenna elements may in all instances be suitable to use (for instance to select between MIMO and BF cases) and for instance only 4 elements 502-505 might be used in some configurations/instances.

One parameter affecting the beam profile/mode is the antenna element spacing: for instance one may have spacing, related to the wavelength $\lambda$, of the transmission, of the order $\lambda/2$, $\lambda$, $2\lambda$, $4\lambda$, and so on. Where larger antenna spacing indicates a MIMO case and smaller spacing indicates beam former case. For instance in the above example of 4 used antenna elements in a nine element antenna matrix, only the corner antenna elements 502-505 of the three by three antenna matrix 501 may be used thus increasing the effective spacing between the used antenna elements.

An existing site deployment may be measured or modeled in order to compute the whiteness index that is used for a database. The measurement of the site may, for example, be a gridding of the geographical area for which the site has been defined to cover. At a grid point a power source (carrier) is located and at the BS the corresponding index is computed along with the path loss. The obtained values for each grid position are saved for use in a database for the site in question. In the event that a significant change has occurred at a site, e.g. new buildings, a new measurement may be made and the database can be updated. The database may be used to predict the capacity of the site (the coverage area), e.g. by assuming a user density and antenna technique capability. The reason for predicting is to, for example, facilitate forecast of future network expansion needs. In addition, the database information can be used as side information for real time scenarios, as will be discussed below.

The solution according to the present invention may be used as side information for scheduling in several ways for example, by evaluating a specific User Equipment (UE) position a whiteness index close to the number one, means that this position is suitable for MIMO transmission. In conjunction with an existing database of the site a more reliable evaluation may be made. An additional benefit of having a database is that the measurements made at the creation of the database may be seen as spatial signatures. During normal operation the BS may evaluate the baseband signal such that the signatures in the database may be matched with the BS response. Hence, for instance the UE position may be identified if the response signature for it is matched with a in the database stored signature. Methods for evaluating signatures may for example be Viterbi like processing. The trajectory of signatures maps the user to a trajectory in the specific cell. That is, it is for example possible to determine if a user is moving out or into a good MIMO area. The evaluation may for instance be done in two ways:

1. baseband processing;
2. protocol based processing.

The first approach implies that the baseband data is collected and preprocessed by a set of antenna arrangement weights, e.g. for a Uniform Linear Array (ULA) antenna ten beam directions may be evaluated using, e.g. ten antenna weight sets. The processed baseband signal result in an azimuth spectrum which is transformed to the spatial impulse response, which is directly applicable in the whiteness index evaluation. The second approach implies that the BS uses a "fake page" mechanism (fake implies that the paging mechanism is performed without a page content message), thus, forcing the paged UE to respond with for instance a RACH message (Random Access Channel); the UE subject to an antenna weight set. The obtained UE response can be used in the whiteness index directly. It should be noted that other types of messages may be sent from the BS in order to force the UE to respond in a suitable manner for use in the present invention depending on transmission type/protocol and so on.

A UE may for instance demand a certain transmission TX mode and the BS may then evaluate if this will be granted, given the specific location of the UE with respect to flatness of that point (and also with respect to available resources of the BS, load capacity, and other parameters affecting the transmission to/from the BS).

Obtaining the position of a UE in the cell may be used for several purposes for instance for locating a person in distress in an e-911 (enhanced 911 service) solution (i.e. where the communication system may geographically locate a person (or at least the UE) not able to respond to a distress call receiver but where the UE is still communicating with the infrastructure). It may be used for tracking a UE, vehicle, object, or similar for preventing theft of a vehicle or object or for keeping track of a delivery vehicle route in order to optimize deliveries.

The present invention is applicable to all types of wireless communication configurations that use a plurality of antennas for transmitting and/or receiving communication signals and which may select transmission mode.

It should be noted that even though the present invention has been exemplified using a base station other MIMO equipped devices may be implemented with the solution according to the present invention, e.g. a mobile phone, a laptop, a router, an access point, a gateway, and so on assuming they have a wireless communication interface of suitable type operating with a plurality of antennas (e.g. WLAN (wireless local area network), WPAN (wireless personal area network), Cellular networks, and so on). Standards where the present solution may find applicability is for instance IEEE 802.11, 802.15 and 802.16 series of protocols, 3GPP based protocols, and so on. For instance special site deployment devices may be used during "scouting" of the cell for obtaining cell whiteness characteristics before deploying the actual base station in the cell. As discussed earlier in this document the solution according to the present invention may be used for determining optimal or near optimal base station location, base station configuration (hardware and software setup), antenna configuration(s) (e.g. number of antennas and direction of antenna transmitting, for instance selecting a sub set of available antennas for use in communication with a specific UE), and so on. Also, it should be noted that the actual whiteness analysis may be provided in any of the above mentioned infrastructure devices or some other infrastructure device arranged to receive signal information from the antennas of the BS.

It should be noted that the word "comprising" does not exclude the presence of elements or steps other than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

DEFINITIONS AND ABBREVIATIONS

BF Beam Former
BS Base Station
CDF Cumulative Density Function
CQI Channel Quality Index
FIR Finite Impulse Response
MIMO Multiple Input Multiple Output
PAS Power Azimuth Spread
RACH Random Access CHannel
SNR Signal to Noise Ratio
SVD Singular Value Decomposition
UE User Equipment
ULA Uniform Linear Array

The invention claimed is:

1. A method of selecting transmission mode in a wireless network cell, comprising the steps of:
   receiving in an infrastructure node at least one wireless signal from a mobile node in the wireless cell; the signal being received in a plurality of antennas;
   analyzing in the infrastructure node the signal using an algorithm for determining a spectrum flatness property of the signal;
   storing in the infrastructure node in a database the determined flatness property of the signal in relation to a geographical position in the wireless cell;
   using the determined flatness property for selecting transmission mode in communication between the infrastructure node and to a node located at the geographical position.

2. The method according to claim 1, further comprising a step of receiving signals relating to a plurality of positions in the wireless cell.

3. The method according to claim 1, wherein the step of analyzing comprise using a flatness algorithm:

$$V = \frac{\frac{1}{2\pi}e^{\int_{-\pi}^{\pi}\log(|H_0(\omega)|^2)d\omega}}{\frac{1}{2\pi}\int_{-\pi}^{\pi}|H_0(\omega)|^2 d\omega}$$

where $H_0$ is the spectrum and is computed from the Fourier transform of the spatial impulse response h(d):

$$H_0(\omega) = \sum_{d=0}^{N} h(d)e^{j\omega d}$$

and N−1 is the number of antennas used for receiving the signal.

4. The method according to claim 1, further comprising a step of sorting measurements into different transmission mode categories using at least one pre determined threshold of flatness index in relation to geographical positions in the cell.

5. The method according to claim 1, wherein the step of selecting transmission mode comprises one of multiple input multiple output or beam former.

6. The method according to claim 1, further comprising steps of comparing the received signal with the database and determining a geographical position of the mobile node using the comparison.

7. The method according to claim 6, further comprising a step of using the determined geographical position in an e-911 service.

8. The method according to claim 1, further comprising a step of selecting a sub set of antenna elements from available antenna elements using the result of selected transmission mode.

9. The method according to claim 1, further comprising a step of sending a message to a mobile node from the infrastructure node forcing the mobile node to transmit a signal useable in determining the flatness of a location.

10. The method according to claim 9, wherein the mobile node is forced to respond with a Random Access Channel message, i.e. a RACH message.

11. A communication node (4) for controlling wireless communication in a communication network, the node comprising a transceiver portion (208), a processing unit (201), a memory unit (202), and a network communication interface (203), the transceiver portion is arranged to communicate with a plurality of antennas (1), characterized in that the processing unit (201) is arranged to receive at least one wireless signal via the transceiver portion from a mobile node, to analyze the received signal using a flatness algorithm, to characterize a geographical position in a communication cell of the mobile node according to a flatness index, and to use the determined flatness index when selecting transmission mode between the communication node and a mobile node located at the geographical position.

12. The node according to claim 11, wherein the processor is further arranged to receive signal from the mobile node relating to a plurality of geographical positions of the communication cell.

* * * * *

UNITED STATES PATENT AND TRADEMARK OFFICE
CERTIFICATE OF CORRECTION

| | | |
|---|---|---|
| PATENT NO. | : 8,219,074 B2 | Page 1 of 1 |
| APPLICATION NO. | : 12/996659 | |
| DATED | : July 10, 2012 | |
| INVENTOR(S) | : Lindgren et al. | |

It is certified that error appears in the above-identified patent and that said Letters Patent is hereby corrected as shown below:

On the Title Page, in Item (75), under "Inventors", in Column 1, Line 1, delete "Vastra Frolunda" and insert -- Västra Frölunda --, therefor.

On the Title Page, in Item (75), under "Inventors", in Column 1, Line 2, delete "Tyreso" and insert -- *Tyresö* --, therefor.

In Column 3, Line 56, delete "programmable gate array)." and insert -- Programmable Gate Array). --, therefor.

In Column 4, Line 29, delete "sequence)" and insert -- sequence). --, therefor.

In Column 6, Line 7, delete "it self" and insert -- itself --, therefor.

In Column 7, Lines 65-66, delete "(wireless local area network)," and insert -- (Wireless Local Area Network), --, therefor.

In Column 7, Lines 66-67, delete "(wireless personal area network)," and insert -- (Wireless Personal Area Network), --, therefor.

Signed and Sealed this
Eighteenth Day of December, 2012

David J. Kappos
*Director of the United States Patent and Trademark Office*